(12) United States Patent
Hohensee et al.

(10) Patent No.: US 7,265,854 B1
(45) Date of Patent: Sep. 4, 2007

(54) METHOD AND APPARATUS FOR MANAGING COMPLEX PRESENTATION OBJECTS USING GLOBALLY-UNIQUE IDENTIFIERS

(75) Inventors: Reinhard Heinrich Hohensee, Boulder, CO (US); Craig D Brossman, Boulder, CO (US); Robert William Goings, Longmont, CO (US); Arthur Ray Roberts, Boulder, CO (US); John Thomas Varga, Longmont, CO (US); Calvin Larry Doescher, Longmont, CO (US); Lynn Mette Mastie, Longmont, CO (US); David Earl Stone, Longmont, CO (US); Dwight Ross Palmer, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/490,772

(22) Filed: Jan. 24, 2000

(51) Int. Cl.
  *G06F 15/00* (2006.01)
  *G06F 7/00* (2006.01)
(52) U.S. Cl. .................... 358/1.15; 707/5; 358/450; 358/1.18
(58) Field of Classification Search ............... 358/1.15, 358/1.16, 1.18, 450; 707/100, 5; 709/200, 709/217, 219, 225; 711/100
See application file for complete search history.

(56) References Cited

U.S. PATENT DOCUMENTS

| | | | |
|---|---|---|---|
| 5,522,077 A | 5/1996 | Cuthbert et al. | |
| 5,678,038 A | 10/1997 | Dockter et al. | |
| 5,724,575 A * | 3/1998 | Hoover et al. | ................ 707/10 |
| 5,727,220 A * | 3/1998 | Hohensee et al. | .......... 715/513 |
| 5,813,020 A | 9/1998 | Hohensee et al. | |
| 5,822,506 A | 10/1998 | Chen et al. | |
| 5,835,098 A * | 11/1998 | Lipton | ........................ 345/589 |
| 5,872,895 A * | 2/1999 | Zandee et al. | ............... 358/1.9 |
| 5,920,863 A | 7/1999 | McKeehan et al. | |
| 6,091,518 A * | 7/2000 | Anabuki | ..................... 358/500 |
| 6,094,278 A * | 7/2000 | Smith et al. | ............... 358/1.16 |
| 6,134,583 A * | 10/2000 | Herriot | ....................... 709/217 |
| 6,144,458 A * | 11/2000 | McLachlan et al. | ....... 358/1.15 |
| 6,209,062 B1 * | 3/2001 | Boland et al. | ............. 711/134 |
| 6,330,068 B1 * | 12/2001 | Matsuyama | ................ 358/1.14 |
| 6,330,565 B1 * | 12/2001 | Nesbitt | ................... 707/103 R |
| 6,427,032 B1 * | 7/2002 | Irons et al. | ................. 382/306 |
| 6,636,891 B1 * | 10/2003 | LeClair et al. | ............. 709/208 |
| 6,665,672 B2 * | 12/2003 | Myers et al. | ................. 707/10 |

(Continued)

OTHER PUBLICATIONS

Hansen, Brad. "The Dictionary of Computing & Digital Media, Terms & Acronyms", 1999, Frankilin, Beedle & Associates Inc., pp. 51-52.*

*Primary Examiner*—Douglas Q. Tran
*Assistant Examiner*—Chan S. Park
(74) *Attorney, Agent, or Firm*—David W. Lynch; Chambliss, Bahner & Stophel PC (57) ABSTRACT

A method and apparatus for managing complex presentation objects using globally-unique identifiers. Downloaded objects are identified by globally-unique identifiers to maintain object integrity and to facilitate capturing downloaded objects for reuse without additional download time overhead. An object may be referenced by selected indicia, such as a name, a globally-unique identifier or a globally-unique identifier and an object locator, The object is located by the selected indicia. Then, a decision is made whether to allow capture of the object based upon whether the selected indicia includes a globally-unique identifier and is secure.

31 Claims, 7 Drawing Sheets

U.S. PATENT DOCUMENTS 6,791,703 B1 * 9/2004 Maeda et al. ............... 358/1.15
6,856,415 B1 * 2/2005 Simchik et al. ............ 358/1.15
6,980,310 B1 * 12/2005 Shimada et al. ........... 358/1.15
7,126,717 B2 * 10/2006 Jeyachandran et al. ...... 358/1.9

* cited by examiner

METHOD AND APPARATUS FOR MANAGING COMPLEX PRESENTATION OBJECTS USING GLOBALLY-UNIQUE IDENTIFIERS

BACKGROUND OF THE INVENTION

1. Field of the Invention

This invention relates in general to printing systems, and more particularly to a method and apparatus for managing complex presentation objects using globally-unique identifiers.

2. Description of Related Art

Print systems include presentation architectures, which are provided for representing documents in a data format that is independent of the methods utilized to capture or create those documents. One example of an exemplary presentation system, which will be described herein, is the AFP™ (Advanced Function Presentation) system developed by International Business Machines Corporation. However, those skilled in the art will recognize that the present invention is not meant to be limited to the AFP™ system, but rather the AFP™ system is presented herein as merely one example of a presentation system applicable to the principles of the present invention.

According to the AFP™ system, documents may contain combinations of text, image, graphics, and/or bar code objects in device and resolution independent formats. Documents may also contain and/or reference fonts, overlays, and other resource objects, which are required at presentation time to present the data properly. Additionally, documents may also contain resource objects, such as a document index and tagging elements supporting the search and navigation of document data for a variety of application purposes. In general, a presentation architecture for presenting documents in printed format employs a presentation data stream. To increase flexibility, this architecture can be further divided into a device-independent application data stream and a device-dependent printer data stream.

A data stream is a continuous ordered stream of data elements and objects that conform to a given formal definition. Application programs can generate data streams destined for a presentation device, archive library, or another application program. The Mixed Object Document Content Architecture (MO:DCA)™ developed by International Business Machines Corporation of Armonk, N.Y. defines a data stream, which may be utilized by applications to describe documents and object envelopes for document interchange and document exchange with other applications and application services. Interchange is the predictable interpretation of shared information in an environment where the characteristics of each process need not be known to all other processes. Exchange is the predictable interpretation of shared information by a family of system processes in an environment where the characteristics of each process must be known to all other processes.

A mixed object document is a collection of data objects that comprise the document's content and the resources and formatting specifications that dictate the processing functions to be performed on that content. The term "Mixed" in the Mixed Object Document Content Architecture (MO:DCA) refers to both the mixture of data objects and the mixture of document constructs that comprise the document's components. A Mixed Object Document Content Architecture (MO:DCA) document can contain a mixture of presentation objects types, which each have a unique processing requirement. The Mixed Object Document Content Architecture (MO:DCA) is designed to integrate the different data object types into documents that can be interchanged as a single data stream and provides the data stream structures needed to carry the data objects. The MO:DCA data stream also provides syntactic and semantic rules governing the use of objects to ensure different applications process objects in a consistent manner.

In its most complex form a Mixed Object Document Content Architecture (MO:DCA) document contains data and resource objects along with data structures which define the document's layout and composition features. This form is called a Mixed Object Document Content Architecture (MO:DCA) presentation document. Within such a data stream the Mixed Object Document Content Architecture (MO:DCA) components are defined with a syntax that consists of self-describing structures called structured fields. Structured fields are the main Mixed Object Document Content Architecture (MO:DCA) structures and are utilized to encode Mixed Object Document Content Architecture (MO:DCA) commands. A structured field starts with an introducer that uniquely identifies the command, provides a total length for the command, and specifies additional control information such as whether padding bytes are present. The introducer is then followed by data bytes. Data may be encoded within the structured field utilizing fixed parameters, repeating groups, keywords, and triplets. Fixed parameters have a meaning only in the context of the structure that includes them. Repeating groups are utilized to specify grouping of parameters that can appear multiple times. Keywords are self-identifying parameters that consist of a one byte unique keyword identifier followed by a one byte keyword value. Triplets are self-identifying parameters that contain a length field, a unique triplet identifier, and data bytes. Keywords and triplets have the same semantics wherever they are utilized. Together these structures define a syntax for Mixed Object Document Content Architecture (MO:DCA) data streams which provide for orderly parsing and flexible extendibility.

The document is the highest level within the Mixed Object Document Content Architecture (MO:DCA) data stream document component hierarchy. Documents may be constructed of pages, and the pages, which are at the intermediate level, may be made up of data objects. Data objects are at the lowest level and can be bar code objects, graphics objects, image objects and presentation text.

Multiple documents may be collected into a print file. A print file may optionally contain, at its beginning, an "inline" resource group that contains resource objects required for print. Alternatively, the resource objects may be stored in a resource library that is accessible to the print server, or they may be resident in the printer.

A Mixed Object Document Content Architecture (MO:DCA) document in its presentation form is a document which has been formatted and is intended for presentation, usually on a printer or a display device. A data stream containing a presentation document should produce the same document content in the same format on different printers or display devices, dependent on the capabilities of each of the printers or display devices. A presentation document can reference resources that are to be included as part of the document to be presented, which are not present within the document as transmitted within the MO:DCA data stream.

Pages within the Mixed Object Document Content Architecture (MO:DCA) are the level within the document component hierarchy which is utilized to print or display a document's content. Each page has associated environment information that specifies page size and that identifies resources required by the page. This information is carried in a MO:DCA structure called an Active Environment Group (AEG). Data objects contained within each page envelope in the data stream are presented when the page is presented. Each data object has associated environment information that directs the placement and orientation of the data on the page, and that identifies resources required by the object. This information is carried in a MO:DCA structure called an Object Environment Group (OEG).

Delimiters that identify the object type, such as graphics, image or text, bound objects in the data stream. In general, data objects consist of data to be presented and the directives required to present it. The content of each type of data object is defined by an object architecture that specifies presentation functions, which may be utilized within its coordinate space. All data objects function as equals within the Mixed Object Document Content Architecture (MO:DCA) data stream environment. Data objects are carried as separate entities in the Mixed Object Document Content Architecture (MO:DCA) data stream.

Resource objects are named objects or named collection of objects that can be referenced from within the document. In general, referenced resources can reside in an inline resource group that precedes the document in the MO:DCA data stream or in an external resource library and can be referenced multiple times. Resource objects may need to be utilized in numerous places within a document or within several documents.

An object container within the Mixed Object Document Content Architecture (MO:DCA) is an envelope for object data that is not necessarily defined by an International Business Machines Corporation presentation architecture and that might not define all required presentation parameters. The container consists of a mandatory Begin/End structured field pair, an optional Object Environment Group (OEG) and mandatory Object Container Data (OCD) structured fields. If an object is to be carried in Mixed Object Document Content Architecture (MO:DCA) resource groups and interchanged, it must, at a minimum, be enveloped by a Begin/End pair. The Object Classification triplet on the Begin structured field must specify the registered object identifier (OID) for the object data format, and the data must be partitioned into OCD structured fields.

A printer data stream within a presentation architecture is a device-dependant continuous ordered stream of data elements and objects conforming to a given format, which are destined for a presentation device. The Intelligent Printer Data Stream (IPDS)™ architecture developed by International Business Machines Corporation and disclosed within U.S. Pat. No. 4,651,278, which is incorporated herein by reference, defines the data stream utilized by print server programs and device drivers to manage all-points-addressable page printing on a full spectrum of devices from low-end workstation and local area network-attached printers to high-speed, high-volume page printers for production jobs, Print On Demand environments, shared printing, and mailroom applications. The same object content architectures carried in a MO:DCA data stream are carried in an IPDS data stream to be interpreted and presented by microcode executing in printer hardware. The IPDS architecture defines bi-directional command protocols for query, resource management, and error recovery. The IPDS architecture also provides interfaces for document finishing operations provided by pre-processing and post-processing devices attached to IPDS printers.

The IPDS architecture incorporates several important features. As noted above, since the IPDS architecture supports the same objects as those carried by the MO:DCA data stream, the IPDS architecture enables the output of multiple diverse applications to be merged at print time so that an integrated mixed-data page, including text, images, graphics, and bar code objects, results. The IPDS architecture transfers all data and commands through self-identifying structured fields that describe the presentation of the page and provide for dynamic management of resources, such as overlays, page segments and fonts as well as the comprehensive handling of exception conditions. Furthermore, the IPDS architecture provides an extensive acknowledgement protocol at the data stream level, which enables page synchronization of the host (e.g., print server) and printer processes, the exchange of query-reply information, and the return to the host of detailed exception information.

One of the major hurdles to overcome in high-speed color printing, e.g., around 100 pages per minute (ppm), is the large time overhead associated with downloading and processing large color images. For example, an 8×10 CMYK (Cyan, Magenta, Yellow and BlacK) color image, at 600 dots per inch (dpi), JPEG compressed with a compression ration of 10:1, still contains about 10 MB (megabytes) of data.

If the typical attachment bandwidth is 2.5 MB/sec between the printing system and the server containing the image, 4 seconds are required just to download the image from the server to the printing system. While page and resource buffering in the printer can save some of this time, it is clearly incompatible with a print window of 0.5 seconds/page (for a 120 ppm printer).

Resource objects such as overlays may be used to overcome some of this problem in certain circumstances. Overlays may be downloaded, cached, and reused each time the overlay is referenced for printing. However, cached resources are only available in the printer for the duration of the job and are normally deleted under control of the print server or if the printer is powered down or re-started.

Another solution is to download and raster image process (RIP) the complete print file into disk storage, and then print out of the disk storage. However, this method is not suitable for large files because it requires massive amounts of disk storage and incurs a huge download and RIP time prior to printing.

It can be seen that there is a need for a method and apparatus that enables downloaded objects to be reused multiple times by multiple documents and print servers without additional download time overhead.

It can also be seen that there is a need for a method and apparatus for uniquely identifying all downloaded objects to maintain object integrity across print jobs, print servers, etc.

SUMMARY OF THE INVENTION

To overcome the limitations in the prior art described above, and to overcome other limitations that will become apparent upon reading and understanding the present specification, the present invention discloses a method, object identifier and apparatus for managing complex presentation objects using globally-unique identifiers.

The present invention solves the above-described problems by uniquely identifying all downloaded objects to maintain object integrity and capturing downloaded objects in the printer for reuse without additional download time overhead.

A method in accordance with the principles of the present invention includes identifying an object for presentation by a printing system and assigning a globally-unique identifier to the object.

Other embodiments of a method and system in accordance with the principles of the invention may include alternative or optional additional aspects. One such aspect of the present invention is caching an object when downloaded and capturing the object if a globally-unique identifier has been assigned to the object.

Another aspect of the present invention is that a method for processing referenced objects includes referencing an object by a selected indicia, the selected indicia being a name, a globally-unique identifier or a globally-unique identifier and an object locator, searching for the object by the selected indicia and determining if the object is to be captured based upon whether the selected indicia includes a globally-unique identifier.

Another aspect of the present invention is that an object data structure of a data stream for referencing and identifying presentation objects is provided. The object data structure includes a globally-unique identifier assigned to a presentation object, the globally-unique identifier providing integrity to object identification.

Another aspect of the present invention is that an article of manufacture is provided that includes a program storage medium readable by a computer. The medium tangibly embodies one or more programs of instructions executable by the computer to perform a method for processing referenced objects. The method includes referencing an object by a selected indicia, the selected indicia being a name, a globally-unique identifier or a globally-unique identifier and an object locator, searching for the object by the selected indicia and determining whether to capture the object partly based upon whether the selected indicia includes a globally-unique identifier.

Another aspect of the present invention is that a system is provided for processing referenced objects. The system includes a control unit for referencing an object by a selected indicia, the selected indicia being a name, a globally-unique identifier or a globally-unique identifier and an object locator and a print server for searching for the object by the selected indicia, wherein the control unit determines if the object may be captured based upon whether the selected indicia includes a globally-unique identifier.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

In many processing environments, data objects such as images are re-used. By downloading a multi-use image once, and then using the downloaded version when the image is required, the transmission overhead can be minimized. Additional overhead can be minimized by converting the image to final form(s) at download time and caching the final form(s) for later use. A third method of decreasing overhead is to "capture" the image in the printer storage so that it stays in the printer over power cycles.

The present invention provides a method and apparatus for managing complex presentation objects that are re-used using globally-unique identifiers. Such objects must be uniquely-identified to maintain object integrity. For example, assume print job A uses data object "image1", which is captured by the printer. Some time later, print job B also uses a data object "image1". If the identifier "image1" is globally-unique, then job B can use the already loaded or captured version of "image1" and print correctly. If however, the identifier "image1" is not unique, and the use of the identifier in job B refers to a different object than the one captured, the printer will still use the captured (and incorrect) version of "image1", and job B is no longer printed with integrity.

The identifiers are platform-independent, presentation system-independent and print stream-independent. The identifiers allow the downloaded objects to be captured for reuse without additional download time overhead. Thus, the object may be captured by the device the first time it is downloaded. Any reference to the object after it is captured uses the downloaded version and therefore avoids re-transmission. Moreover, it may be referenced by several print streams or presentation systems.

Such references can present the object at a different position, orientation, and size. Object Identifiers (OIDs) are based on an ISO-administered global naming tree, and are described more fully herein below. Under such a naming scheme, each user must have a node in this global naming tree. There are branches from the user's node that lead to division level or sublevel/child nodes and each node is assigned a number. Nodes assigned under a given node are administered by the parent node. Using such an OID to identify and reference the object guarantees object integrity across server sessions and power cycles, i.e., once the OID is found, wherever it is found, it is guaranteed to be the right object.

Figure 1:
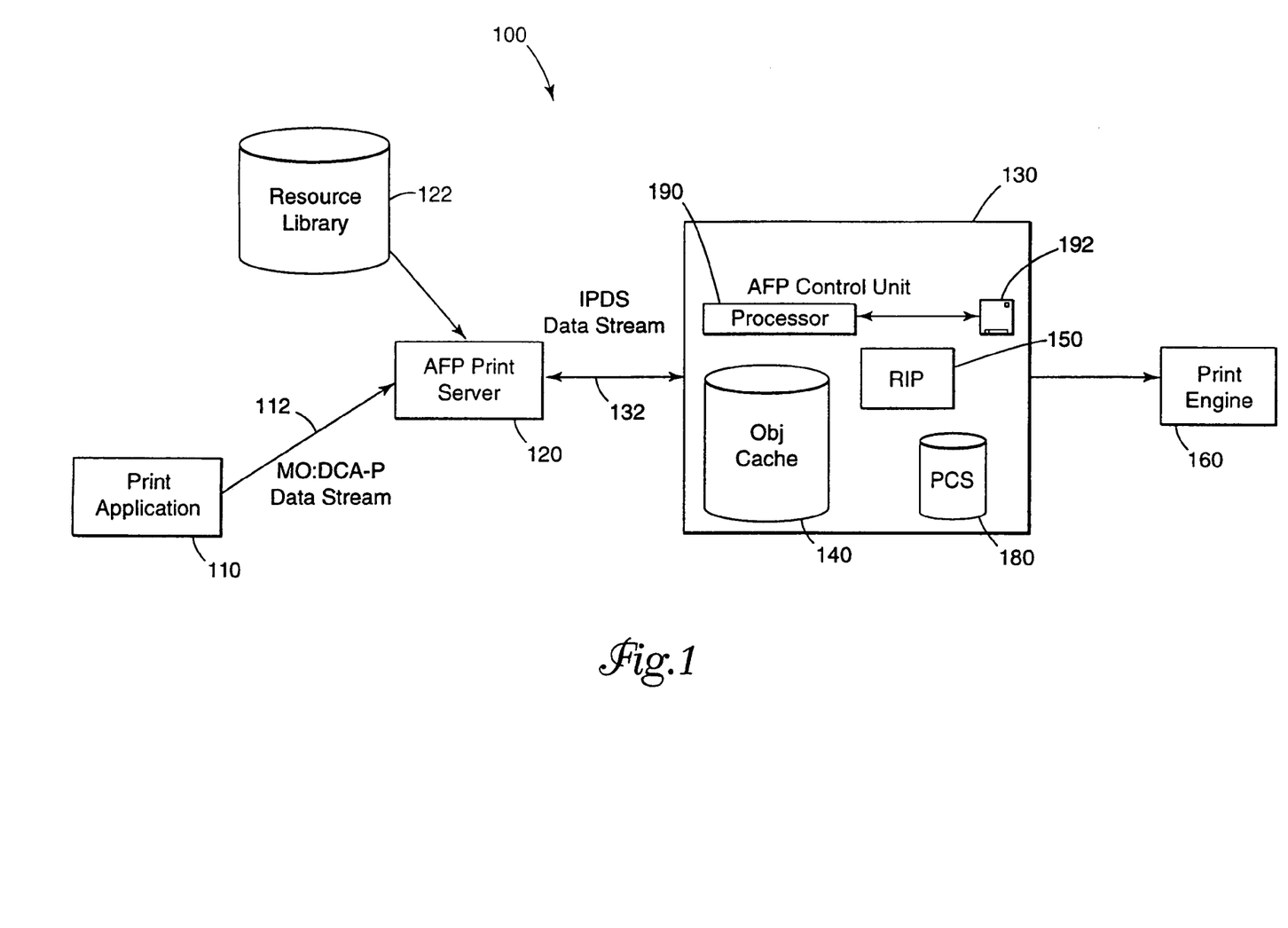
FIG. 1 illustrates an Advanced Function Presentation (AFP™) printing system according to the present invention.

FIG. 1 illustrates an Advanced Function Presentation (AFP) printing system 100 according to the present invention. In FIG. 1, a print application 110 makes a request for the printing of a document. The print application 110 provides a Mixed Object Document Content Architecture (MO:DCA) data stream 112 to the AFP print server 120, also called the Print Service Facility (PSF™). The resource library 122 provides objects to the AFP print server 120. The MO:DCA data stream 112 is provided according to a device-independent page description language (PDL). The AFP print server 120 processes pages of output that mix all of the elements normally found in presentation documents, e.g., text in typographic fonts, electronic forms, graphics, image, lines, boxes, and bar codes. The AFP data stream is composed of architected, structured fields that describe each of these elements.

The AFP print server 120 communicates with an AFP control unit 130 via an Intelligent Printer Data Stream (IPDS) 132. The IPDS data stream 132 is similar to the AFP data steam, but is built specific to the destination printer in order to integrate with each printer's specific capabilities and command set, and to facilitate the interactive dialog between the PSF and the printer. The IPDS data stream 132 may be built dynamically at presentation time, i.e., on-the-fly in real time. Thus, the IPDS data stream is provided according to a device-dependent bi-directional command/data stream.

The AFP control unit 130 includes a cache 140 for maintaining cached objects and a raster image processor 150. The AFP control unit 130 provides sheet maps for printing to a print engine 160. Objects are captured and stored in the printer capture storage 180. The AFP control unit 130 may include a processor 190 that may be configured by program storage medium 192. The medium tangibly embodies one or more programs of instructions executable by the processor to perform the methods illustrated with reference to FIGS. 3 through 8 below. Those skilled in the art will recognize that the processor 190 may alternatively reside in the AFP print server 120 or may be coupled to both the AFP print server 120 and the AFP control unit 130.

To optimize the management of complex resources AFP architecture extensions are used. In this manner, complex objects can be treated as resources that are downloaded once and can be re-used multiple times by multiple documents and print servers. Resources can be assigned globally-unique identifiers that are platform-independent. This allows data streams to be created that are platform-independent and that guarantee the integrity of object identification. Multi-use resources can be captured in the printer and maintained across PSF sessions and printer power cycles. Further, a captured object can be re-used at a different position, clipping, orientation, and size.

To provide globally-unique identifiers for objects, objects are assigned unique identifiers called Object Identifiers (OIDs). In a MO:DCA (AFP) data stream, OIDs are carried in syntax structures called Fully Qualified Name (FQN) triplets, which are, used to reference and identify objects. U.S. Pat. No. 5,813,020, issued Sep. 22, 1998, to Hohensee et al., and which is assigned to International Business Machines Corporation, Armonk, N.Y., and which is incorporated herein by reference, discloses a method and system for managing a presentation data stream which includes an ordered stream of uniquely identified data objects and associated elements which specify format and presentation parameters for those data objects for utilization within a specified application.

Moreover, these OIDs are based on an ISO-administered global naming tree. Each user must have a node in this global naming tree. Under the user's node, there are branches that lead to division level or sublevel/child nodes. Each node is assigned a number. Nodes assigned under a given node are administered by the parent node. An address in the naming tree is specified by the sequence of nodes, or branches, that must be traversed to get to the node. For example, to get to a particular user's node, the following illustrates the branches that must be traversed:

ISO (1)

IDENTIFIED ORGANIZATION (3)

User (18)

Therefore, the address, or OID, of the user node is {1.3.18}.

Any entity that has a node in the ISO naming tree can use this naming scheme to generate unique identifiers for objects. For example, application X might want to use OIDs to identify resources in a mainframe-based printer application. X either has, or can get, a node in the ISO global naming tree. Under that node they can register a node for each license of X. Each license of X can then assign unique OIDs under its node for resource objects.

Another approach to generating object identifiers is to provide an OID-generation utility, which could administer OIDs using the following tree:

1.<..>.<..> . . . <User Node>.<sublevel node>.<System Identifier Node>.<Generator's Node>-<Object Node>

The <User node> is fixed and defined by ISO, the <sublevel node> is fixed and defined by the User. Below there, the sublevel group controls node assignment. The <System Identifier Node> can be an identifier associated with a particular Server System like the CPU ID or an installation key. The <Generator's Node> can be assigned by the sublevel group. For example, application X may be assigned 11, for all X systems. However, those skilled in the art will recognize that the present invention is not meant to be limited to the OID generation scheme described here. Rather, those skilled in the art will recognize that OIDs may be generated in other ways.

A number of schemes that guarantee uniqueness can be used to assign the last component of the OID. One scheme is to use a binary counter. If an 8-byte counter is used to assign OIDs to objects, it could assign 2\*\*64 OIDs before running out of OIDs. However, those skilled in the art will recognize that the present invention is not meant to be limited to 2\*\*64 OIDs, but that the counter could be expanded to provide much greater than 2\*\*64 OIDs.

Another scheme is to use a time and date stamp, which must be generated with a high enough resolution so that consecutive accesses to the time and date server are guaranteed to generate different times.

An image server can generate OIDs for image objects that are loaded into the server and for "child" image objects that the image server may generate from a source image. Each image server needs to generate unique object identifiers (OIDs). To ensure that this is accomplished, a new node is registered under the generator's node. An administrator is assigned to this node. Each image server is assigned a sequential number under this node. The administrator registers each assignment so that the same number is never assigned to two different image servers. The easiest way to do that is simply to start a 2 or 3-byte counter and increment it for each image server so that each image server is uniquely identified.

The syntax for representing the OID within structured fields is based on the ISO Basic Encoding Rules and is defined in ISO/IEC 8825:1990(E). It consists of the following:

Identifier byte

Length of content bytes

Content bytes

Figure 2:
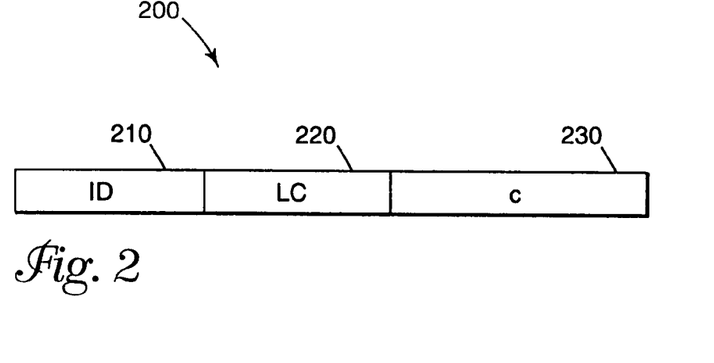
FIG. 2 illustrates one embodiment of a globally-unique object identifier (OID)

FIG. 2 illustrates one embodiment of an OID 200 according to the present invention. The OID includes the identifier byte 210, the length of content byte 220 and the content 230. However, those skilled in the art will recognize that the present invention is not meant to be limited to the particular syntax illustrated in FIG. 2. Rather, the syntax structure shown in FIG. 2 is merely one example of a syntax structure for an OID.

According to the present invention, high-speed color printing is enabled by managing complex resources in a way that ensures resources are present in the device when they are required by an AFP page. Two conceptual methods are provided in a printer for holding downloaded resources: caching and capturing. Whenever a resource is downloaded from the print server to the printer, it is cached. This means that the resource is available in the printer for the duration of the job, but probably no longer than that. In addition, cached resources are deleted when the server session ends, and when the printer is powered down or re-started.

Capturing overcomes the temporary nature of caching. Once an object is captured, it becomes a resident resource in the printer and lasts across server sessions and printer power-off cycles. Resources may be captured by the printer if the resource is made capturable and if the printer has sufficient storage to save the resources. The print server 120 or the control unit 130 may delete such resources (based on a scheme such as least recently used (LRU)) if the storage allocated for capturing is full and the current set of captured resources are not all deemed to be in active usage. However, those skilled in the art will recognize that objects in memory may be deleted according to several criteria, including deleting non-active, least-recently used objects first, deleting the largest objects first or deleting the smallest objects first, so that the capture memory is most effectively utilized.

The printer operator may also be given some control over deleting captured resources. Since captured resources persist across many jobs, guaranteed uniqueness of the resource identifiers is crucial to the integrity of the capturing scheme. In the present invention, this uniqueness is guaranteed by OIDs as discussed above. Therefore an object that is to be a candidate for capture must be identified with an OID.

There is also a security aspect to capturing objects. For example, assume that an object to be captured is a color corporate logo with the CEO's signature. This object is assigned an OID. A malicious user may try to get the device to capture a different object, using the same OID. If allowed to succeed, an application that references the OID, might get the wrong object. Therefore, in the descriptions that follow, object capture is always qualified with "if secure". Those skilled in the art will recognize that the determination of what "if secure" means is left up to the platform and the system administrator for the specific installation. In general, inline resource groups are not considered secure unless the platform supports some mechanism for making them secure.

In any case, PSF will not allow the device to capture a resource unless it knows, by platform-dependent means, that the object is secure.

The print server (PSF) manages resource objects. This includes querying the printer to see if the object is already cached or captured, downloading the object if not, and deleting a cached object at the end of the print job if necessary. This allows the object, once downloaded, to be invoked multiple times, with different presentation semantics, without requiring another download.

Management of resources is triggered by the presence of a Map Data Resource (MDR) structured field in the MO:DCA (AFP) data stream. To uniquely identity resources which may be shared, captured or otherwise processed by the PSF, the present invention incorporates Object Identifiers (OIDs) as described above. An OID, as defined by the ISO naming conventions, will be unique for each resource or version of particular resource.

Figure 3:
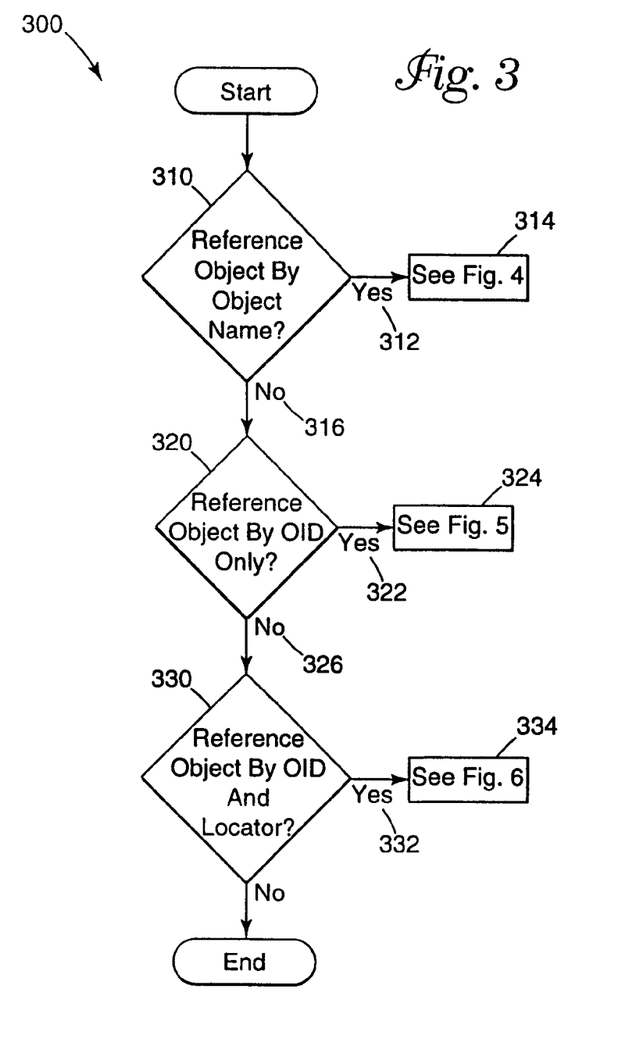
FIG. 3 is a flow chart illustrating three ways MDRs may reference a resource.

MDRs can be built to reference a resource in one of three ways. FIG. 3 is a flow chart 300 illustrating the three ways MDRs may reference a resource. The object may be referenced by object name 310. If the object is referenced by object name 312, it is processed 314 according to the flow chart illustrated in FIG. 4 as discussed below. If the object is not referenced by the object name 316, then the object may be referenced by OID only 320. If the object is reference by OID only 322, it is processed 324 according to the flow chart illustrated in FIG. 5. If the object is not referenced by OID only 326, then the object may be referenced by OID and a locator 330. If the object is reference by OID only 332, it is processed 334 according to the flow chart illustrated in FIG. 6.

The 'traditional' way to reference an object is to reference the object by an object name. However, such a reference is normally platform-dependent. The advantage of this approach is that the resource itself can be changed, e.g., it could be re-versioned, without changing the data stream. The disadvantage is that the reference cannot be guaranteed to be unique, therefore the object cannot be captured and re-used across printer power cycles.

The second alternative is to reference the object by its unique object identifier (OID). This type of referencing is platform-independent and absolutely guarantees that when the object is found, wherever it may be, it is the correct object. The disadvantage is that if the object is re-versioned, it must be assigned a new OID, which requires a change to the data stream. It may also be difficult to find this object in the resource library if it is not captured in the device or specified in an inline resource group.

A third alternative is to reference the object by its OID and add an object locator. This is similar to the second alternative, but adds a locator for finding the object in the server's resource library if it is not in the printer or in an inline resource group.

The three scenarios discussed above will now be described with reference to FIGS. 4 through 6. Each case, as shown below, begins with the premise that the reference (object name or OID) has not been previously processed by the PSF. The duration of the process is defined by the specific PSF Host system. If the reference has been processed, PSF internal accounting will indicate that the object is available in the presentation device.

Figure 4:
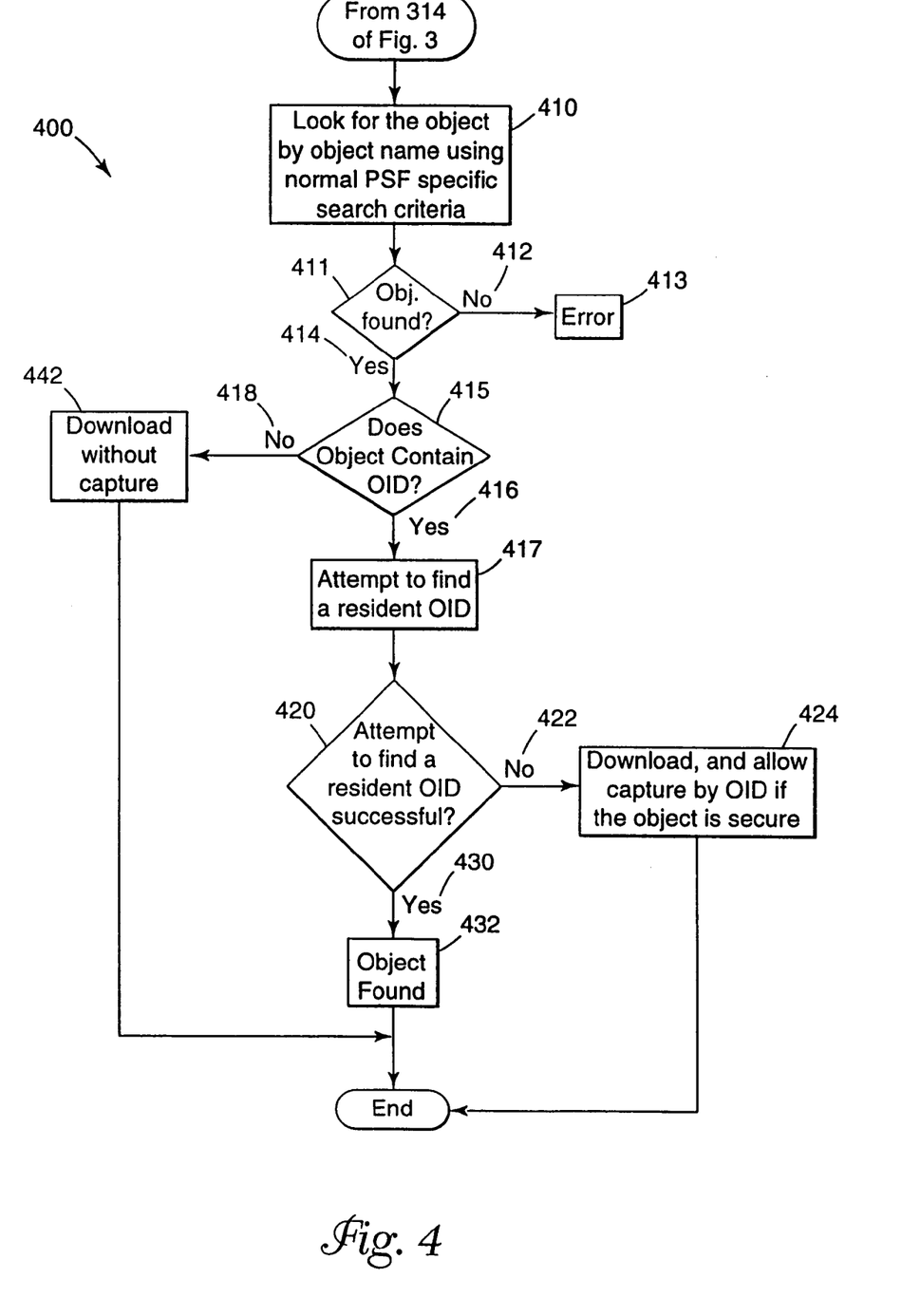
FIG. 4 illustrates the process where the MDR reference is to object name only.
Figure 5:
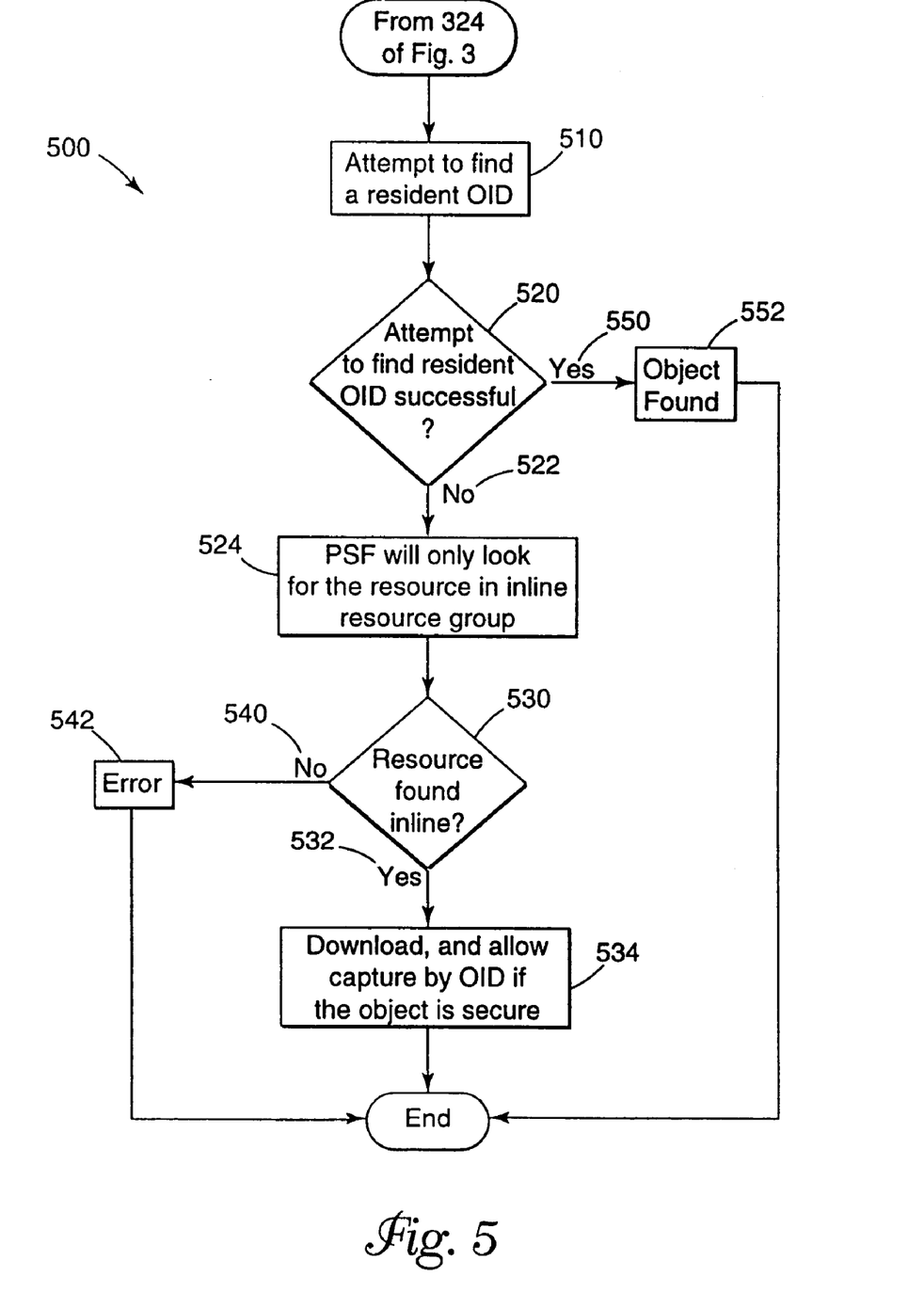
FIG. 5 illustrates the process where the MDR reference is to OID Only.

FIG. 4 illustrates the process where the MDR reference is to object name only 400. First, look for the object by object name using normal platform specific search criteria 410. Next, determine if object is found 411. If not found 412, it is an error 413. If found 414, determine if Object contains an OID 415. If Object contains an OID 416, attempt to find a resident OID 417. Next, determine whether the attempt is successful 420. If it fails 422, download, and allow capture by OID if the object is secure 424. If successful 430, the object is found 432. If the object does not contain an OID 418, download without capture 442. With regard to versioning in the process described with reference to FIG. 4, the user controls versioning by placing the desired resource ahead of all other resources in the PSF specific search path. PSF will locate the first resource and process as defined above, FIG. 5 illustrates the process where the MDR reference is to OID Only 500. First, an attempt is made to find a resident OID 510. Then, a determination is made as to whether the attempt to find the resident OID is successful 520. If successful 550, the object is found 552. If a resident OID is not found 522, PSF can look for the resource in the inline resource group 524. Then, a determination is made as to whether the resource is found inline 530. If the resource is found inline 532, download and allow capture by OID if the object is secure 534. Otherwise 540, the object is not found inline 542 (Error). With regard to versioning in the process described with reference to FIG. 5, versioning is not available via the PSF.

Figure 6:
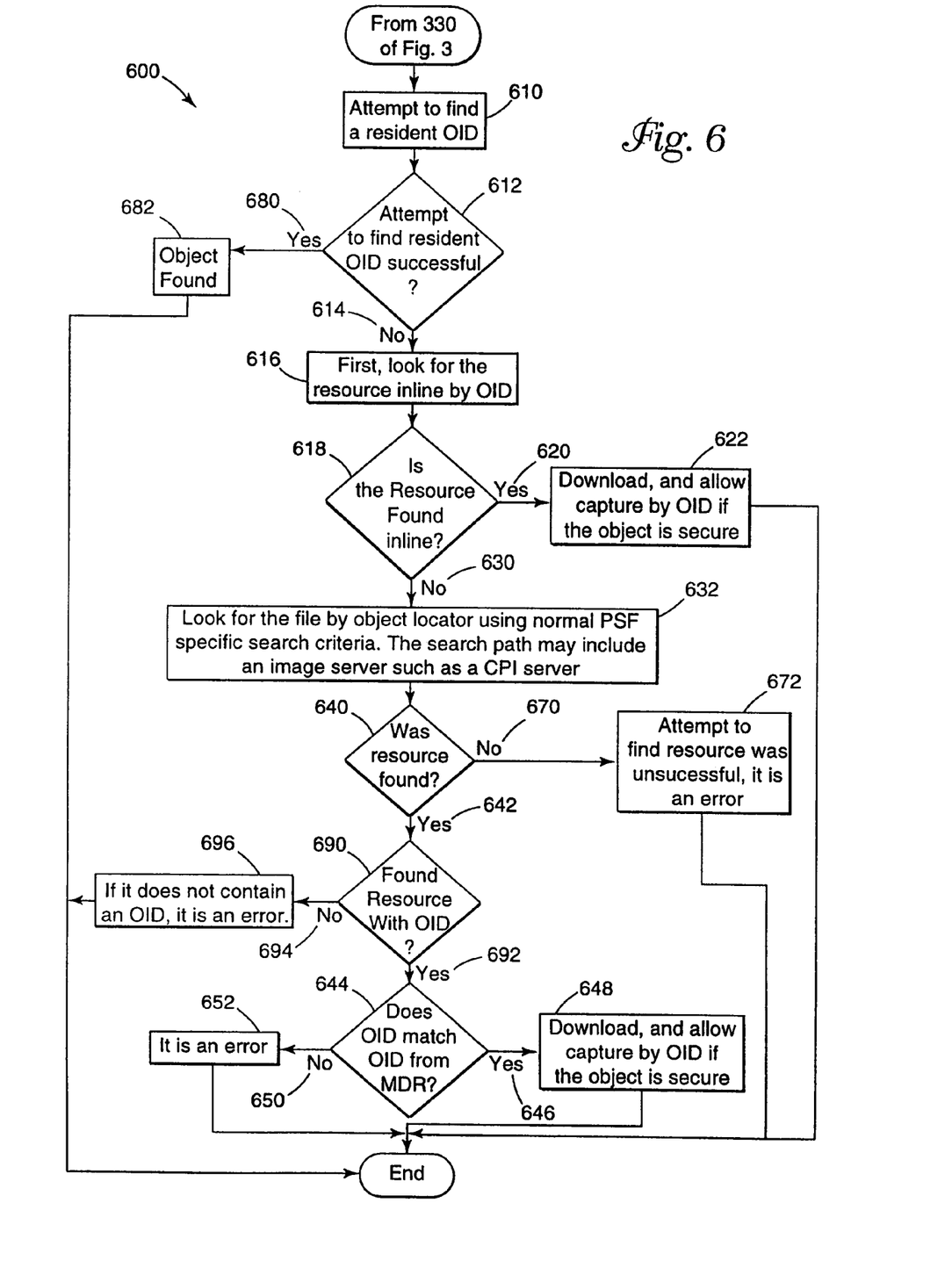
FIG. 6 illustrates the process where the MDR reference is to OID and the MDR specifies an object locator.

FIG. 6 illustrates the process where the MDR reference is to OID and the MDR specifies an object locator 600. First, an attempt is made to find a resident OID 610. Next, a determination is made as to whether the attempt to find a resident OID is successful 612. If successful 680, the object is found 682. It not successful 614, first, look for the resource inline by OID 616. Then, determine whether the resource is found 618. If the resource is found 620, download and allow capture by OID if the object is secure 622. If the inline search is unsuccessful 630, look for the file by object locator using normal PSF specific search criteria 632. The search path may include an image server such as an OPI server. A determination is then made as to whether the resource is found 640. If the resource is found 642, a check is made to see if the located resource has an OID 690. If the found resource does not have an OID 694, it is an error 696. If the resource is found with OID 692, the OID is checked to determine whether it matches the OID from MDR 644. if there is a match 646, download, and allow capture by OID if the object is secure 648. If it contains an OID which fails to match the OID from MDR 650, it is an error 652. If the resource is not found 670, the attempt is deemed to be unsuccessful and it is an error 672. With regard to versioning in the process described with reference to FIG. 6, versioning is not normally available via the PSF. A utility may be able to alter the data stream prior to submitting to PSF. This utility may replace old OIDs with newer versions.

Figure 7:
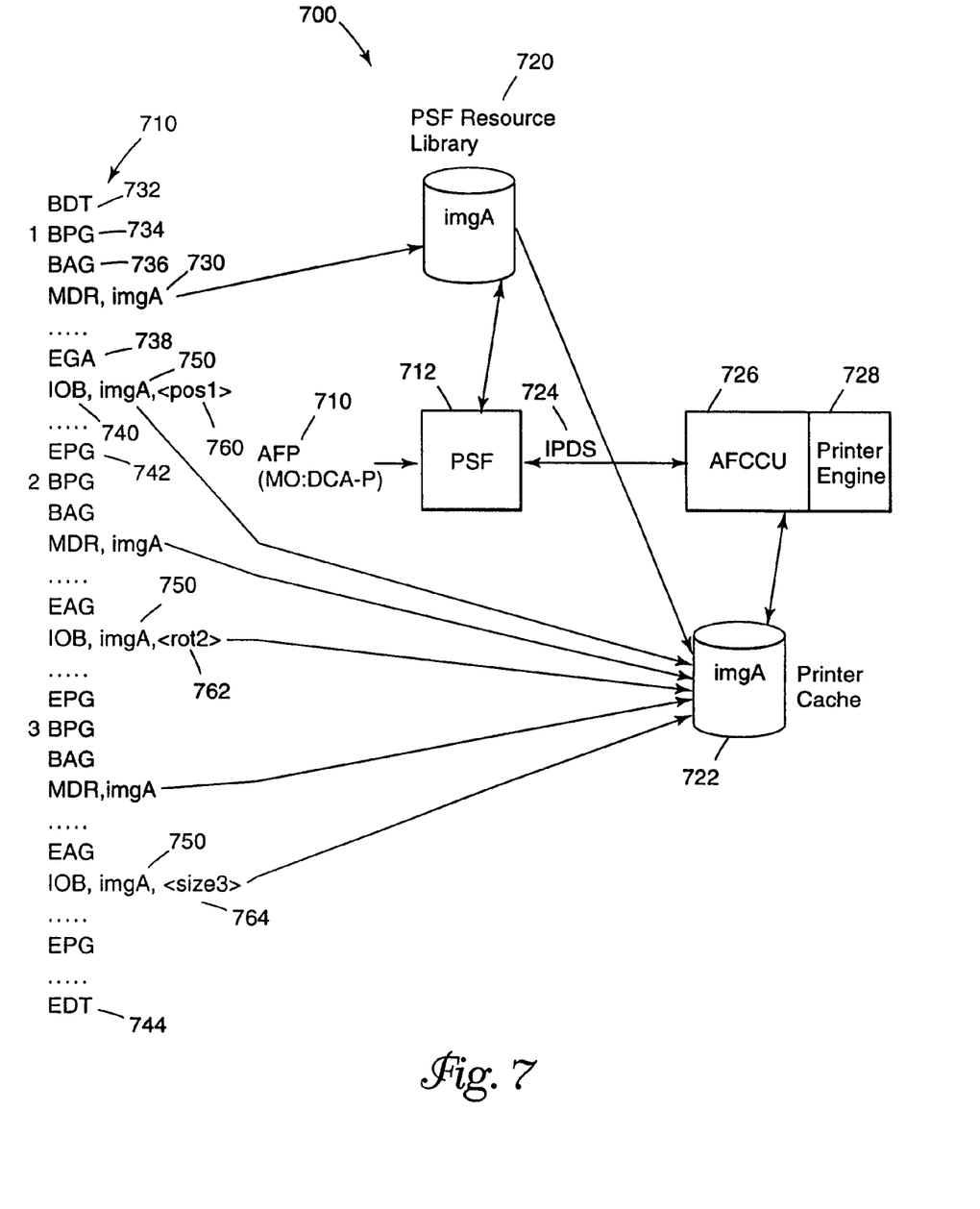
FIG. 7 illustrates the treatment of objects as resources according to the present invention.

FIG. 7 illustrates the treatment of objects as resources 700 according to the present invention. In FIG. 7, the PSF 712 receives an AFP (MO:DCA-P) data stream 710 from a print application. The PSF 712 is provided images from the PSF resource library 720. The PSF resource library 720 provides images to the printer cache 722 using the IPDS 724. The PSF 712 uses the Intelligent Printer Data Stream (IPDS) printer protocol 724 to take full advantage of the advanced printer capabilities. The PSF 712 and the Advanced Function Common Control Unit (AFCCU) 726 (also referred to as the AFP control unit) communicate via the IPDS 724 to control the printer engine 728.

In FIG. 7, an image 730 is reference in the PSF resource library 720 in the first page. BDT 732 signals the beginning of the document, BPG 734 signals the beginning of a page, BAG 736 signals the beginning of the active environment group, EAG 738 signals the end of the active environment group, IOB 740 signals the inclusion of an object, EPG 742 signals the end of a page and EDT 744 signals the end of the document. Thus, the AFP data stream defines a document having three pages (1, 2 and 3). Each of the pages includes image A 750.

Each page has an Active Environment Group (AEG). The MDR in each AEG triggers PSF resource management, which ensures that the resource object "imgA" is in the printer before the respective page is processed. Note that only the first MDR causes a download of the image to the printer cache. Each page includes the object "imgA" using an Include Object (IOB) structured field. The IOB can override the presentation parameters for "imgA." On the first page, the position is overridden with <pos1> 760, on the second page, the orientation is overridden with <rot2> 762, and on the third page the size is overridden with <size3> 764. Since the first MDR encountered 730 caused a download of the image from the PSF resource library to the printer cache, all includes of the image use the copy of the object in the printer cache.

Figure 8:
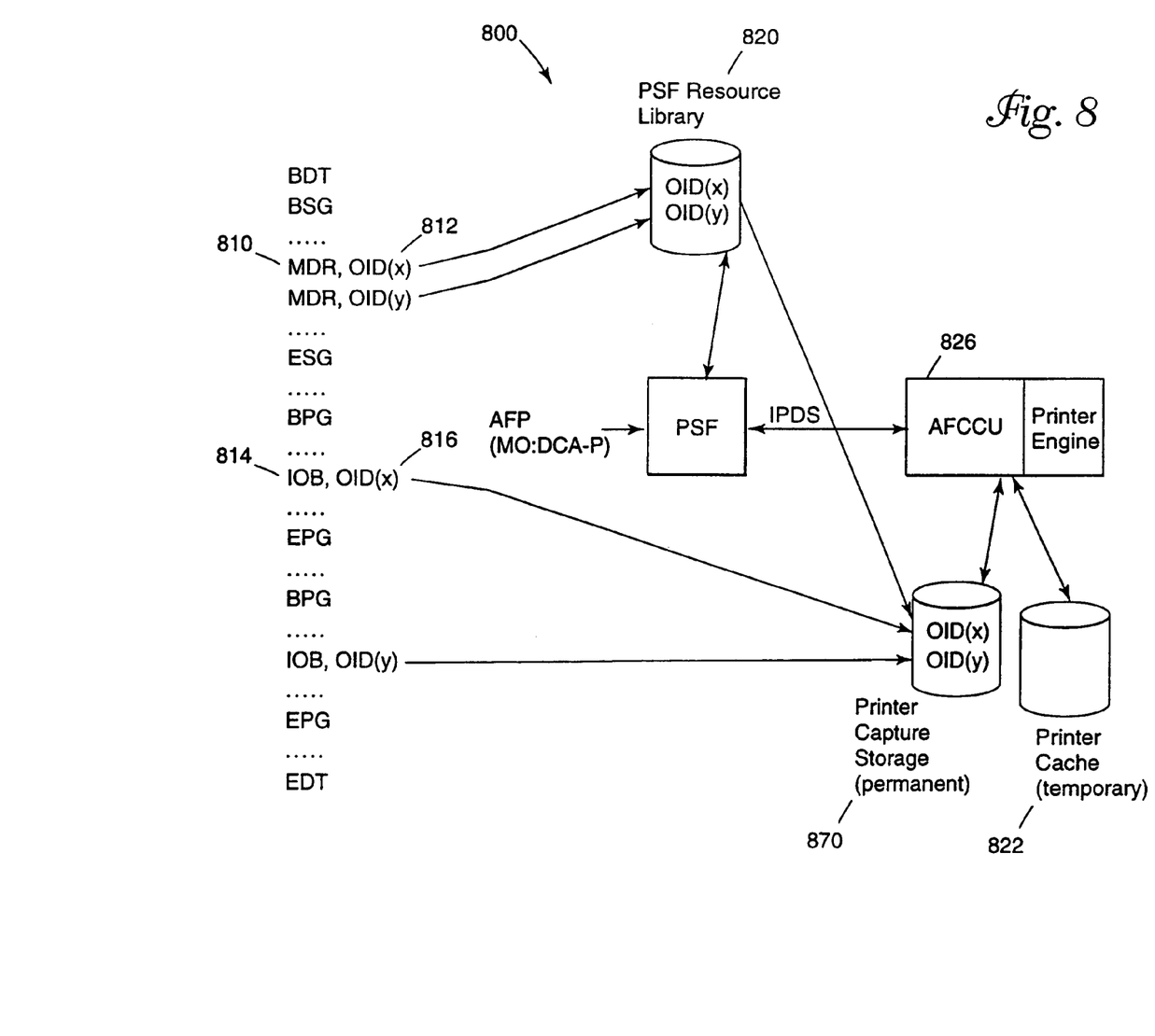
FIG. 8 illustrates object capture in the printer according to the present invention.

FIG. 8 illustrates object capture in the printer 800 according to the present invention. In FIG. 8, the MDR 810 references an image with an OID(x) 812. The image from the PSF resource library is downloaded and captured in the printer capture storage 870. The AFCCU 826 may access images that are either captured 870 or cached 822. The IOB structured field 814 includes the images with OID(x) 816, which has already been captured in the printer capture storage 870.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for enabling re-use of presentation objects by a printing system, comprising:
   receiving from a print application a print data stream at a print server of a printer;
   analyzing at the print server the print data stream to identify by a globally-unique identifier a presentation object not present in the print data stream, the globally-unique identifier assigned to the presentation object and identifying the presentation object in the print data stream for printing by the printer,
   retrieving at the print server the presentation object identified by the globally-unique identifier assigned to the presentation object;
   generating a device-dependent data stream containing the retrieved presentation object, wherein the device-dependent data stream is configured for capabilities of a specific print engine; and
   capturing the identified presentation object in permanent printer capture storage at the printer using the assigned globally-unique identifier.

2. The method of claim 1, wherein the globally-unique identifier assigned to the object allows the object to be securely and correctly referenced for re-use.

3. The method of claim 1, wherein the globally-unique identifier assigned to the object is platform-independent.

4. The method of claim 1, wherein the globally-unique identifier is based upon an International Standards Organization administered global naming tree.

5. The method of claim 1, wherein the globally-unique identifier is contained in a syntax structure of a data stream.

6. The method of claim 5, wherein the data stream is a Mixed Object Document Content Architecture data stream.

7. The method of claim 1, wherein the globally-unique identifier is assigned by:
    requesting, in an International Standards Organization administered global naming tree, a first node for an application that uses the object;
    registering, under the first node, a second node for each license of the application; and
    assigning a globally-unique identifier for the object, the globally-unique identifier including an indication of the object, the first node and the second node.

8. The method of claim 1, wherein the globally-unique identifier is assigned by generating a globally-unique identifier for an object, the generated globally-unique identifier includes an indication of a first node representing an application that uses the object, of a second node for each license of the application and of the object.

9. The method of claim 8, wherein the indication of the object includes a time stamp.

10. The method of claim 9, wherein the time stamp includes an indication of the date and time.

11. The method of claim 8, wherein the indication of the object includes a checksum value.

12. The method of claim 8, wherein the indication of the object includes a binary counter.

13. A printer configured for managing presentation objects for multiple use, comprising:
    a print server for receiving from a print application a print data stream, the print server analyzing the print data stream to identify by a globally-unique identifier a presentation object not present in the print data stream, the globally-unique identifier assigned to the presentation object and identifying the presentation object in the print data stream for printing, the print server further retrieving the presentation object identified by the globally-unique identifier assigned to the presentation object and generating a device-dependent data stream containing the retrieved presentation object, wherein the device-dependent data stream is configured for capabilities of a specific print engine; and
    permanent printer capture storage, coupled to the print server, for capturing the identified presentation object in the device-dependent data stream using the assigned globally-unique identifier.

14. The system of claim 13 further comprising a print server, the print server deleting previously captured objects in the printer capture storage.

15. The system of claim 13 further comprising a print server, the print server deleting previously downloaded or active objects.

16. The system of claim 15 further comprising a printer control unit for marking objects in the permanent printer capture storage as removable.

17. The system of claim 16, wherein a removable object is deleted when a capture request is received to make storage available to capture a new resource.

18. A system for processing referenced objects, comprising:
    a print server for receiving from a print application a print data stream, the print server analyzing the print data stream to identify by a globally-unique identifier a presentation object not present in the print data stream, the globally-unique identifier assigned to the presentation object and identifying the presentation object in the print data stream for printing, the print server further retrieving the presentation object identified by the globally-unique identifier assigned to the presentation object and generating a device-dependent data stream containing the retrieved presentation object, wherein the device-dependent data stream is configured for capabilities of a specific print engine; and
    a control unit for receiving the device-dependent data stream from the print server and providing sheet maps to a print engine for printing; and
    permanent printer capture storage, coupled to the control unit, for capturing the identified presentation object in the device-dependent data stream using the assigned globally-unique identifier.

19. The system of claim 18, wherein the data stream references the object by an object name and the print server searches for the object by object name.

20. The system of claim 19, wherein the print server attempts to find the object resident in a presentation device when the object is referenced with a globally-unique identifier.

21. The system of claim 18, wherein the control unit references the object by the globally-unique identifier.

22. The system of claim 21, wherein the print server attempts to find the object resident in the presentation device using a globally-unique identifier.

23. The system of claim 22, wherein the print server searches for the resource inline when the search for a resident globally-unique identifier fails.

24. The system of claim 18, wherein the data stream references the object by the globally-unique identifier and an object locator.

25. The system of claim 24, wherein the print server attempts to find the object by searching for a resident globally-unique identifier.

26. The system of claim 25, wherein the print server searches for the resource inline when the search for a resident globally-unique identifier fails.

27. The system of claim 25, wherein the print server looks for the object by object locator in a resource library when the inline search is unsuccessful.

28. The system of claim 27, wherein the print server determines whether the globally-unique identifier assigned to the object matches the globally-unique identifier referenced.

29. The system of claim 27, wherein the print server provides an indication of an error if the globally-unique identifier assigned to the object does not match the globally-unique identifier referenced.

30. The system of claim 27, wherein the print server provides an indication of an error if the object does not contain a globally-unique identifier.

31. A computer program storage device readable by a computer and tangibly embodying one or more computer programs of instructions executable by the computer to perform operations for managing presentation objects for multiple use, the operations comprising:
    receiving from a print application a print data stream at a print server of a printer;
    analyzing at the print server the print data stream to identify by a globally-unique identifier a presentation object not present in the print data stream, the globally-unique identifier assigned to the presentation object and identifying the presentation object in the print data stream for printing by the printer, retrieving at the print server the presentation object identified by the globally-unique identifier assigned to the presentation object;

generating a device-dependent data stream containing the retrieved presentation object, wherein the device-dependent data stream is configured for capabilities of a specific print engine; and capturing the identified presentation object in permanent printer capture storage at the printer using the assigned globally-unique identifier.

* * * * *